United States Patent
Bullock et al.

(10) Patent No.: US 9,852,622 B2
(45) Date of Patent: Dec. 26, 2017

(54) METHODS AND SYSTEMS FOR REAL-TIME ADVANCED CONGESTION IDENTIFICATION AND WARNING

(71) Applicant: PURDUE RESEARCH FOUNDATION, West Lafayette, IN (US)

(72) Inventors: Darcy M Bullock, Lafayette, IN (US); Stephen M Remias, Shelby Township, MI (US); Haoxiang Howell Li, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 14/844,119

(22) Filed: Sep. 3, 2015

(65) Prior Publication Data

US 2016/0071412 A1   Mar. 10, 2016

Related U.S. Application Data

(60) Provisional application No. 62/046,656, filed on Sep. 5, 2014.

(51) Int. Cl.
| | |
|---|---|
| G08G 1/01 | (2006.01) |
| G08G 1/09 | (2006.01) |
| G08G 1/0967 | (2006.01) |
| H04L 29/08 | (2006.01) |
| G08G 1/095 | (2006.01) |
| G01C 21/36 | (2006.01) |

(52) U.S. Cl.
CPC ....... *G08G 1/0141* (2013.01); *G01C 21/3694* (2013.01); *G08G 1/0112* (2013.01); *G08G 1/0133* (2013.01); *G08G 1/095* (2013.01); *G08G 1/096716* (2013.01); *G08G 1/096775* (2013.01); *H04L 67/18* (2013.01); *H04L 67/26* (2013.01)

(58) Field of Classification Search
CPC .... G08G 1/0141; G08G 1/0125; G08G 1/091; G08G 1/0967; H04L 67/26; H04L 67/18
USPC ........................................ 701/119
See application file for complete search history.

(56) References Cited

U.S. PATENT DOCUMENTS

| | | | | |
|---|---|---|---|---|
| 6,064,318 | A | * | 5/2000 | Kirchner, III .... G08G 1/096716 340/905 |
| 2014/0195068 | A1 | * | 7/2014 | Boss ........................ G06F 19/00 701/1 |
| 2014/0278047 | A1 | * | 9/2014 | Bahl ...................... G08G 1/164 701/301 |

OTHER PUBLICATIONS

Remias, S., T. Brennan, C. Day, H. Summers, E. Cox, D. Horton, and D. Bullock. 2012 Indiana Mobility Report: Full Version. 2013 doi: 10.570311288284315190, ISBN 978-1-62260-257-5 (Aug. 2013).
Remias, S., T. Brennan, G. Grimmer, E. Cox, D. Horton, and D. Bullock. 2011 Indiana Interstate Mobility Report-Full Version. Indiana Mobility Reports. 2012 doi: 10.570311288284314680 (Aug. 2012).
Cone: The instant I.T.S. System. http://iconeproducts.com/ (Aug. 2014).

* cited by examiner

*Primary Examiner* — Anne M Antonucci
(74) *Attorney, Agent, or Firm* — Thomas | Horstemeyer, LLP

(57) ABSTRACT

The present disclosure relates to a system and method for locating slow or stopped vehicles on a roadway and alerting drivers approaching the back of a queue, and in particular to intelligent transportation systems and traffic management.

20 Claims, 21 Drawing Sheets

METHODS AND SYSTEMS FOR REAL-TIME ADVANCED CONGESTION IDENTIFICATION AND WARNING

CROSS-REFERENCE TO RELATED APPLICATIONS

The present U.S. patent application is related to and claims the priority benefit of U.S. Provisional Patent Application Ser. No. 62/046,656, filed Sep. 5, 2014, the contents of which is hereby incorporated by reference in its entirety into this disclosure.

TECHNICAL FIELD

The present disclosure generally relates to a system and method for locating slow or stopped vehicles on a roadway and alerting drivers approaching the back of a queue, and in particular to intelligent transportation systems and traffic management.

BACKGROUND

This section introduces aspects that may help facilitate a better understanding of the disclosure. Accordingly, these statements are to be read in this light and are not to be understood as admissions about what is or is not prior art.

Currently in the practice of traffic congestion management there are typically humans in the loop that identify traffic problems using cameras or driver phone calls. The information is disseminated via means that include Traffic Message Signs, radio broadcasts, and TWITTER® feeds. This approach is time consuming and is limited to areas of the road network accessible by a costly Intelligent Transportation Systems infrastructure. A significant national concern is the frequency of fatal crashes due to distracted and inattentive drivers colliding into the back of a slowed or stopped queue. In recent years, crowd-sourced probe vehicle data has become commercially available, allowing for engineers and planners to assess traffic conditions on their road networks in real time. The data are provided as an average speed during a one minute interval over a predefined geometric segment of roadway. Using simple arithmetic, the difference in speed from one segment to the next, or delta speed, can then be calculated. This delta speed of average segment speeds is a good indicator if there is traffic congestion within a geometric segment. Using real time data to assess the road conditions and alert drivers will provide a quick and efficient way of preventing back of queue crashes. In the modern era of distracted driving new approaches are necessary to alert drivers before the critical decision point.

There is therefore an unmet need to use real-time data to identify locations with stopped or slowing traffic and alert drivers upstream using flashing lights, audible sirens, or display boards.

SUMMARY

In one aspect, a method for using a geo-referenced field device to query cloud-based traffic data to notify drivers of impending congestion is disclosed. In another aspect, a system for using a geo-referenced field device to query cloud-based traffic data to notify drivers of impending congestion is disclosed. In yet another aspect, a device for using a geo-referenced field device to query cloud-based traffic data to notify drivers of impending congestion is disclosed.

In yet another aspect, a method for using a geo-referenced field device to query cloud-based traffic data to notify drivers of impending congestion is disclosed. The method includes the steps of placing a geo-referenced field device in a field, the geo-referenced field device is communicatively coupled to a server and the geo-referenced field device is configured to obtain a speed data from a cloud source and perform calculations therefrom, contacting the server, the server is in a location where the calculations have been performed, transmitting a message to the geo-referenced field device at a pre-defined interval and at a change of traffic condition, polling calculations from the server via a message from the server configured to monitor traffic conditions, and activating an audio and visual notification by the geo-referenced field device using commands from a message from the server.

In yet another aspect, the geo-referenced field device is configured to have global positioning system (GPS) orientation specified. In yet another aspect, the geo-referenced field device is configured to automatically acquire a location from GPS.

In another aspect, the geo-referenced field device is configured to use an electronic compass to determine orientation. In yet another aspect, the geo-referenced field device is configured to have location specified by an operator. In yet another aspect, the geo-referenced field device is configured to have location adjusted by the operator. In yet another aspect, the cloud based traffic data is centrally-collected point data such as information transportation systems (ITS) between roadway interchanges and intersections. In yet another aspect, the cloud based traffic data is comprised of wireless technology-based segments, such as Bluetooth or WiFi. In yet another aspect, the cloud based traffic data is comprised of commercial probe data, such as INRIX®, NOKIA®, GOOGLE®, and HERE® probe data. In yet another aspect, the audio and visual notification is at least one of a siren, a portable message sign, a fixed message sign, at least one strobe on at least one fixed sign with messages determined by a reporting agency, or at least one strobe on at least one guardrail with at least one advance sign, the at least one advance sign is configured to indicate how to interpret the at least one strobe. In yet another aspect, the geo-referenced field device is powered by at least one of an alternating current power source, a battery power source, or a battery source with solar augmentation.

In another aspect, a system for using a geo-referenced field device to query cloud-based traffic data to notify drivers of impending congestion is disclosed. The system includes a computer, a global positioning system (GPS) device, communicatively coupled to the computer, a cloud data source, a radio communication, and a device configured to deliver messages between the computer and the cloud data source. The radio communication can be a commercial cellular communication. The radio communication can also be an RF device.

DETAILED DESCRIPTION

Figure 1A:
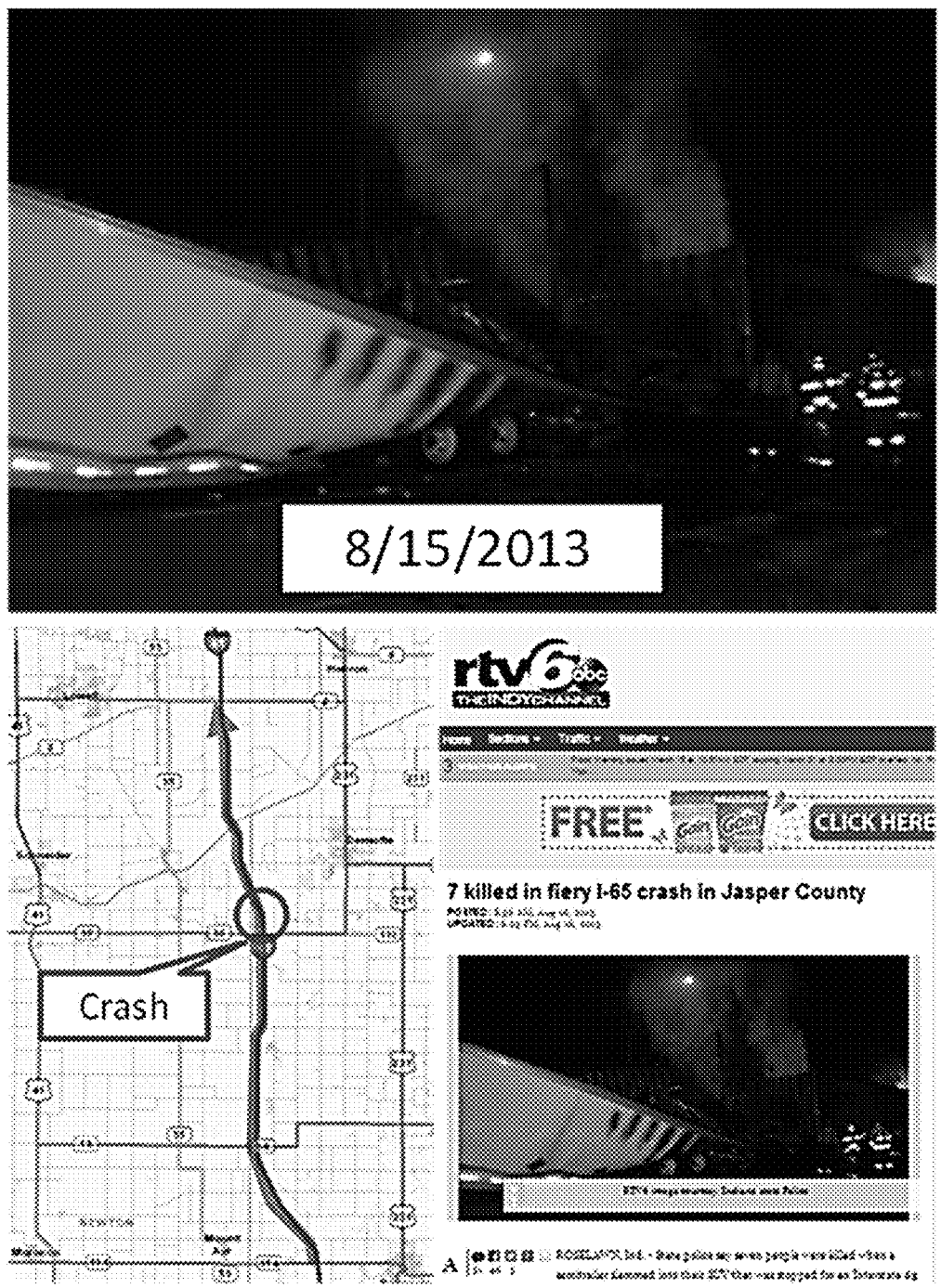
FIGS. 1a-1b are illustrations of end of queue fatal crash examples in Indiana.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In response to the need for a method and system that uses real-time data to identify locations with stopped or slowing traffic and alert drivers upstream using message relay means such as flashing lights, audible sirens, or display boards, such a system and method is disclosed herein. These messages will have various mounting techniques and specifications, which will be discussed in further detail herein.

The purpose of the herein disclosed device, method, and system is to take real-time traffic data and its current geographic location and then output an alert to motorists. The herein described device and system include computer, a global positioning system (GPS) device, a radio communication (commercial cellular or licensed RF device), and a method for delivering messages between the computer and a cloud data source. The device is powered by one of three options: AC, battery, or battery with a solar augmentation. The device either polls or receives automated messages from a server and emits a signal if there is congestion ahead of the device on the roadway. There are variations for how the message is transmitted to the device and how the device displays an alert signal.

In one embodiment, the system and method of the present disclosure provide the means for alerting drivers of upcoming queues by leveraging real-time traffic data. This will be accomplished by displaying a warning signal in advance of stopped or slow moving traffic. This reduces the risk for a back-of-queue crash by alerting any potentially distracted or inattentive drivers of a potential need to slow down. This warning sign can be triggered in a plurality of ways, including with or without a human approval in the loop. In addition, in another embodiment, the installation of this device can be temporary for addressing non-recurring congestion near work zones or maintenance areas. This will involve a temporary setup where the device and warning flashers are mounted to a moveable post or an existing permanent structure.

As a demonstration of the need and use of the herein described method, system, and device, a summary of need and use cases is provided below.

Figure 1B:
Figure 2A:
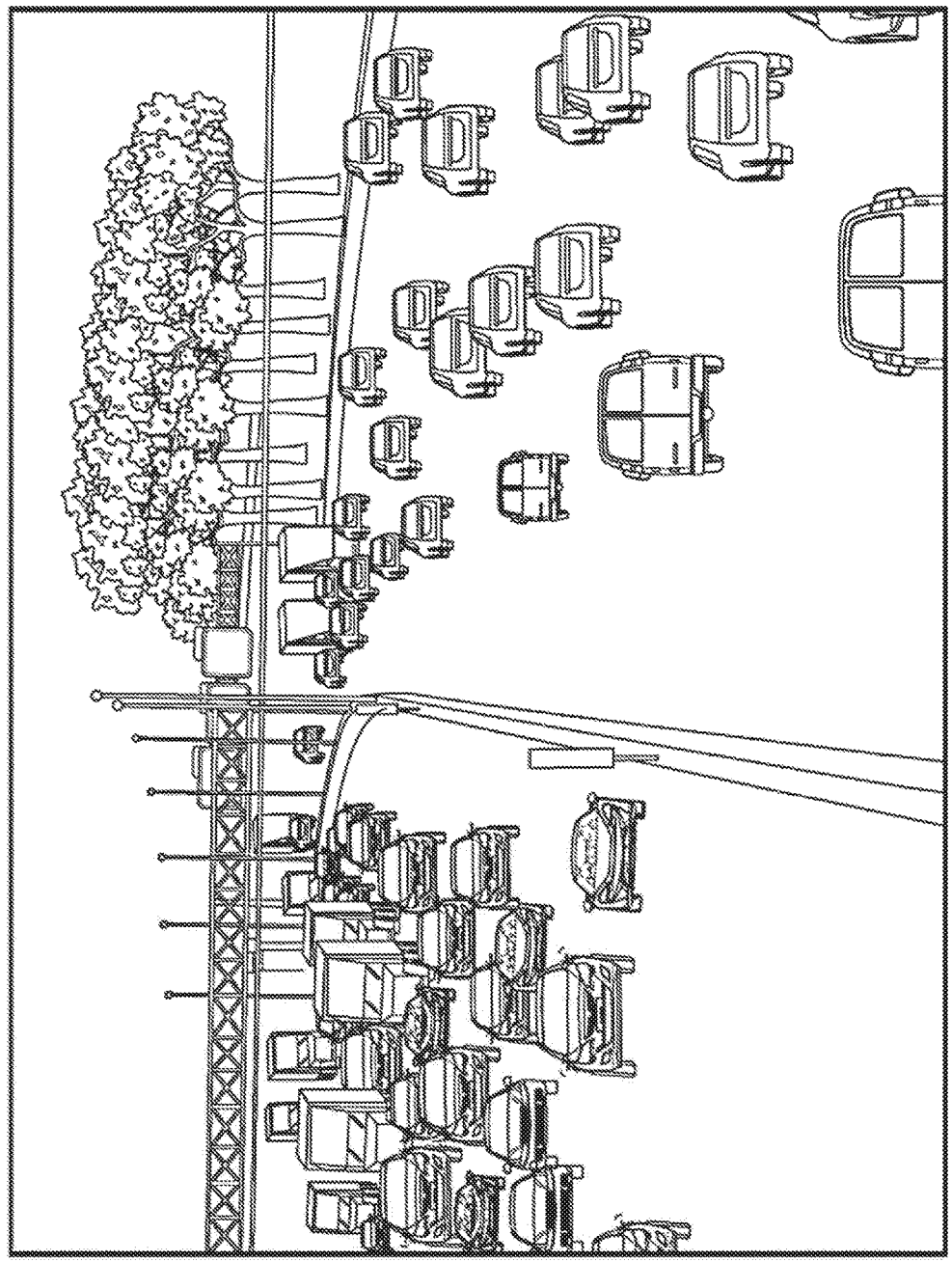
FIGS. 2a-2e illustrate methods of delivering end of queue information to drivers.
Figure 2B:
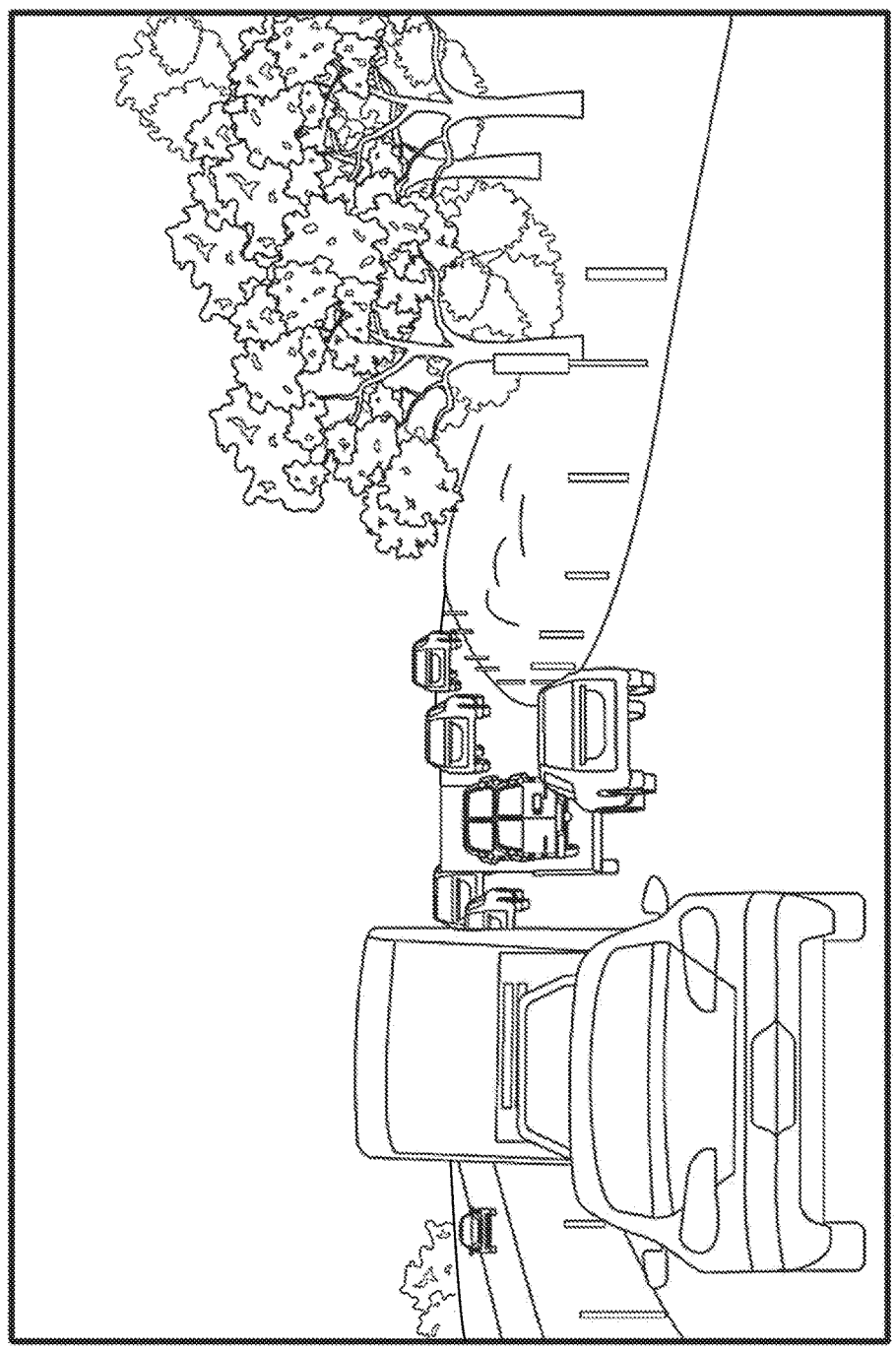
Figure 2C:
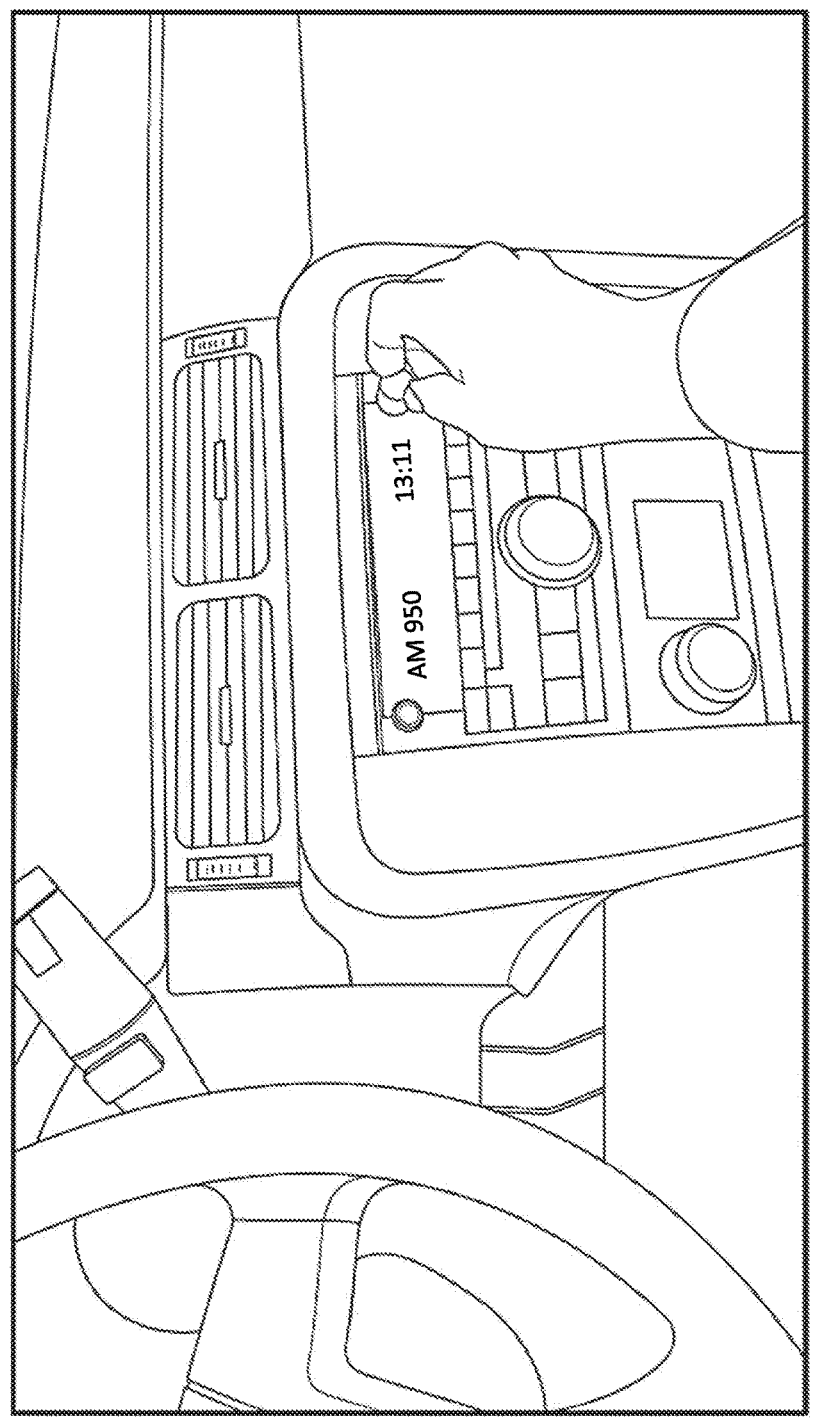
Figure 2D:
Figure 2E:
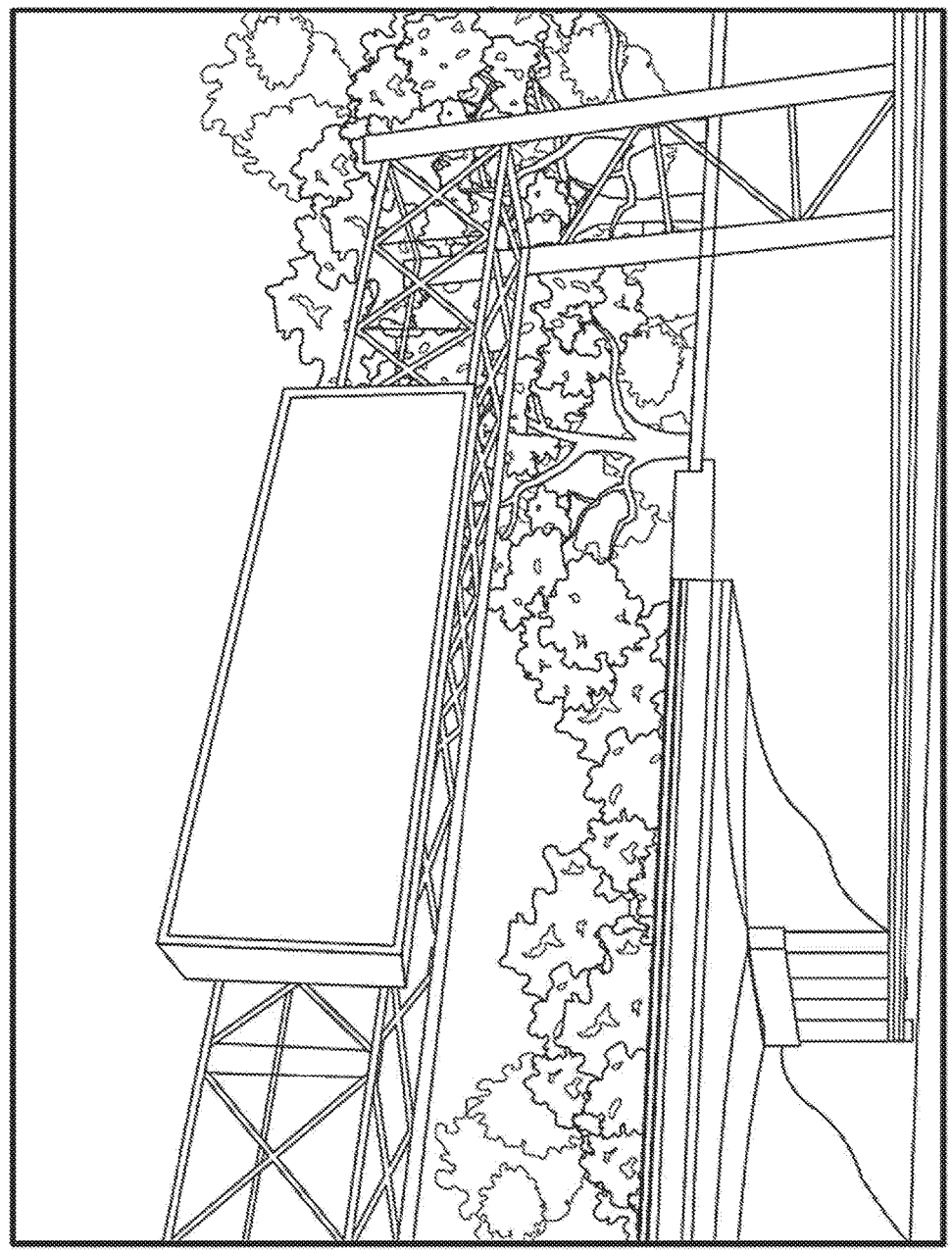

In July and August of 2013 Indiana experienced the loss of 8 passengers in vehicles traveling on Interstate 65 due to crashes (FIGS. 1a and 1b, which show pictures of end of queue fatal crash examples in Indiana). FIG. 1a shows an example occurring on Aug. 15, 2013 on I-65 at mile marker 231 Northbound, which resulted in seven fatalities (photo courtesy of RTV6). FIG. 1b shows an example occurring on Jul. 31, 2013 between IND 10 and IND 2 Northbound, which resulted in one fatality (photo courtesy of nwi.com). The cause of both crashes depicted in FIGS. 1a and 1b were queues due to a workzone in the northbound direction of I-65. In both cases a truck driven by a distracted driver was unable to stop upon arriving at the end of the queue. The truck struck the vehicle at the end of the queue causing a tragic and fatal result. The Indiana Department of Transportation has begun to research and invest in preventative measures to avoid similar crashes in the future. The existing methods of preventing back of queue crashes are illustrated in FIGS. 2a-2e. FIG. 2a shows a typical incident that caused a significant queue on I-94 near Chicago in Indiana. The typical options or means of alerting traffic upstream of a crash include: visually seeing the brake lights of stopped vehicles at the back of a queue (FIG. 2b); audibly hearing traffic updates from an emergency or local radio station (FIG. 2c); visually or audibly being alerted by GPS devices or smartphone-type device applications (FIG. 2d); and visually seeing Traffic Message signs that display the warning (FIG. 2e). These options all have major shortcomings when looking at their cost or effectiveness. Brake lights of vehicles ahead often will not alert a distracted driver soon enough to stop. Traffic updates on the radio are not readily available, involve a human-in-the-loop, and require a driver to tune in to the proper radio network. GPS or smartphone-type device applications often are a distraction to the driver and are limited to tech-savvy users. Traffic Message signs are the best alternative, but are extremely expensive to install and maintain and require extensive infrastructure investments. Additionally, Traffic Message signs typically involve a human-in-the-loop to program the alert on the sign, which is both a costly and inefficient means to quickly identify queues.

Figure 3:
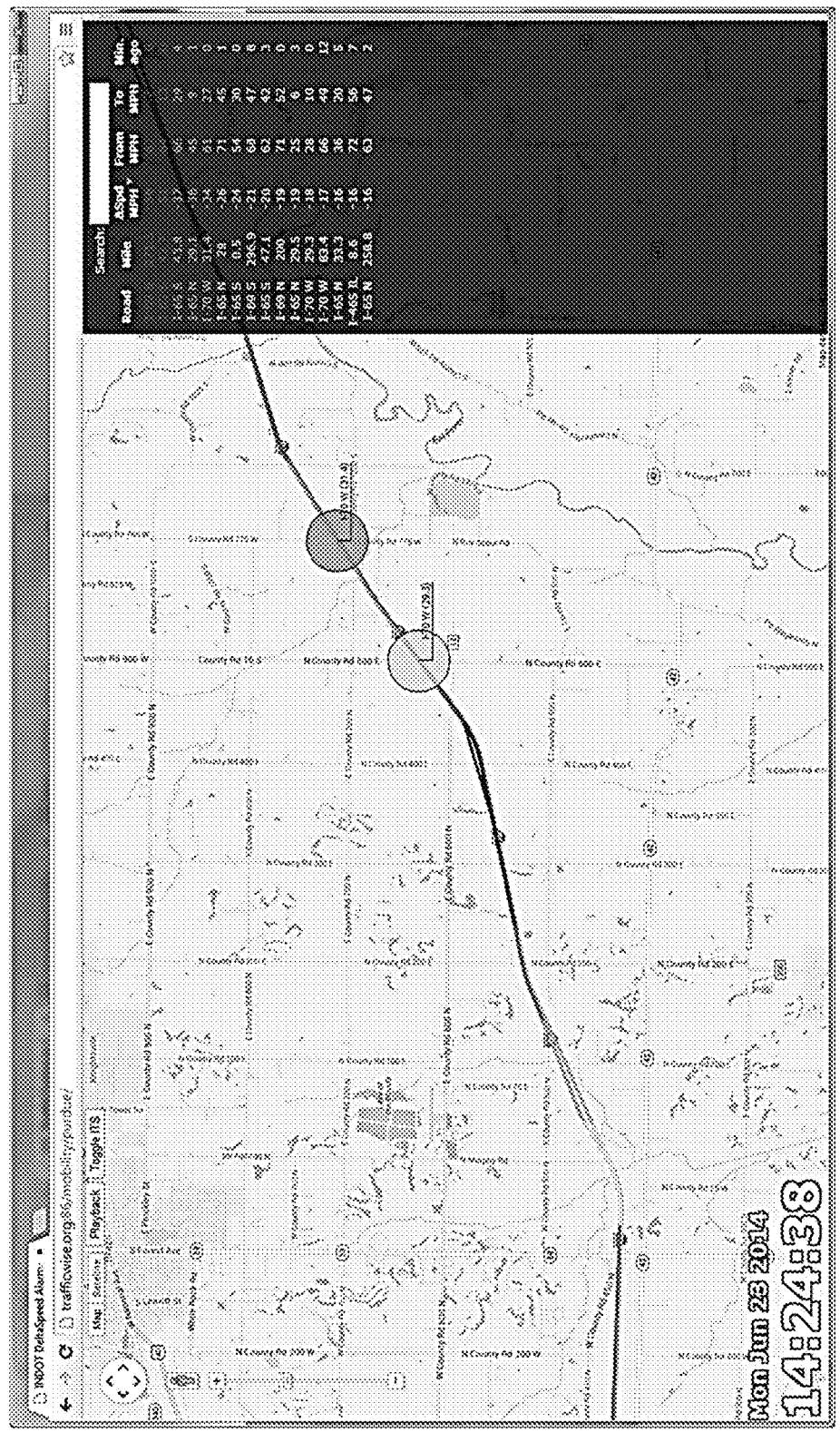
FIG. 3 depicts an embodiment of the herein disclosed incident detection application.
Figure 4:
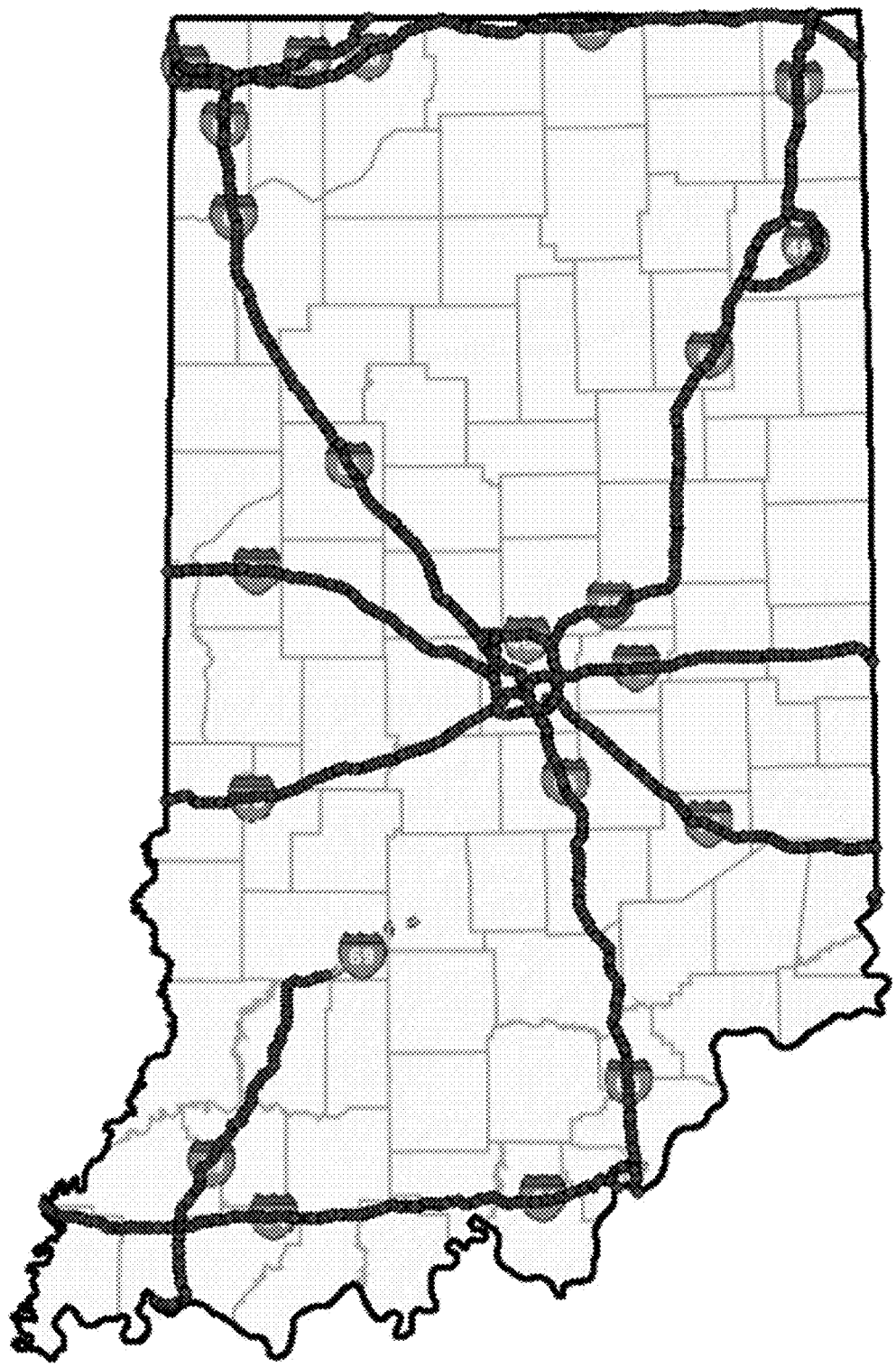
FIG. 4 depicts the over 2,500 interstate segments using crowd sourced probe vehicle data.

In 2014, INDOT-funded research developed an incident detection application using crowd sourced probe vehicle data (FIG. 3). Crowd sourced probe vehicle data is collected using a smartphone-type device and GPS from application users. Third party commercial companies collect the information and calculate average speeds over one minute time periods. This information is then disseminated in near real-time to their clients. Using this cloud data source, the herein disclosed application pinpoints geographic locations where the vehicles have shifted from free-flowing speeds to congested speeds. This performance measure that looks at adjacent segments defined by the crowd sourced probe data providers is known as the "delta speed" between two segments. The benefit of using this crowd sourced probe vehicle data is the coverage across the state and the country. As an example, in the state of Indiana, there are over 2,500 segments (FIG. 4), which results in a delta speed value nearly every two miles on the interstate system in Indiana. These data analyses allow for a scalable approach for locating congestion problems statewide, reducing the dependency of the human-in-the-loop and the cost of traffic detection infrastructure that can be millions of dollars per mile.

Figure 5:
FIG. 5 depicts an example of an incident alert system.

The herein disclosed device will leverage this incident detection system and use it to automate alerts in the field in real time. These alerts will avoid the high infrastructure costs and also will be available for all drivers, and not only to those who use smartphone-type devices or GPS devices while driving. Referring to FIG. 5, an example of such an alert system is shown. This alert is triggered by the device to alert drivers of upcoming congestion. The strobe light on this sign flashes at different frequencies to signify the proximity of the driver to the queue. This significantly reduces the risk of back of queue crashes by giving drivers an additional opportunity to see upcoming congestion. It shall be noted that the alert system is not limited to a flashing strobe light mounted on a sign. The device can also be attached to temporary message signs, permanent message signs, or strobes mounted temporarily on permanent infrastructure.

Figure 6A:
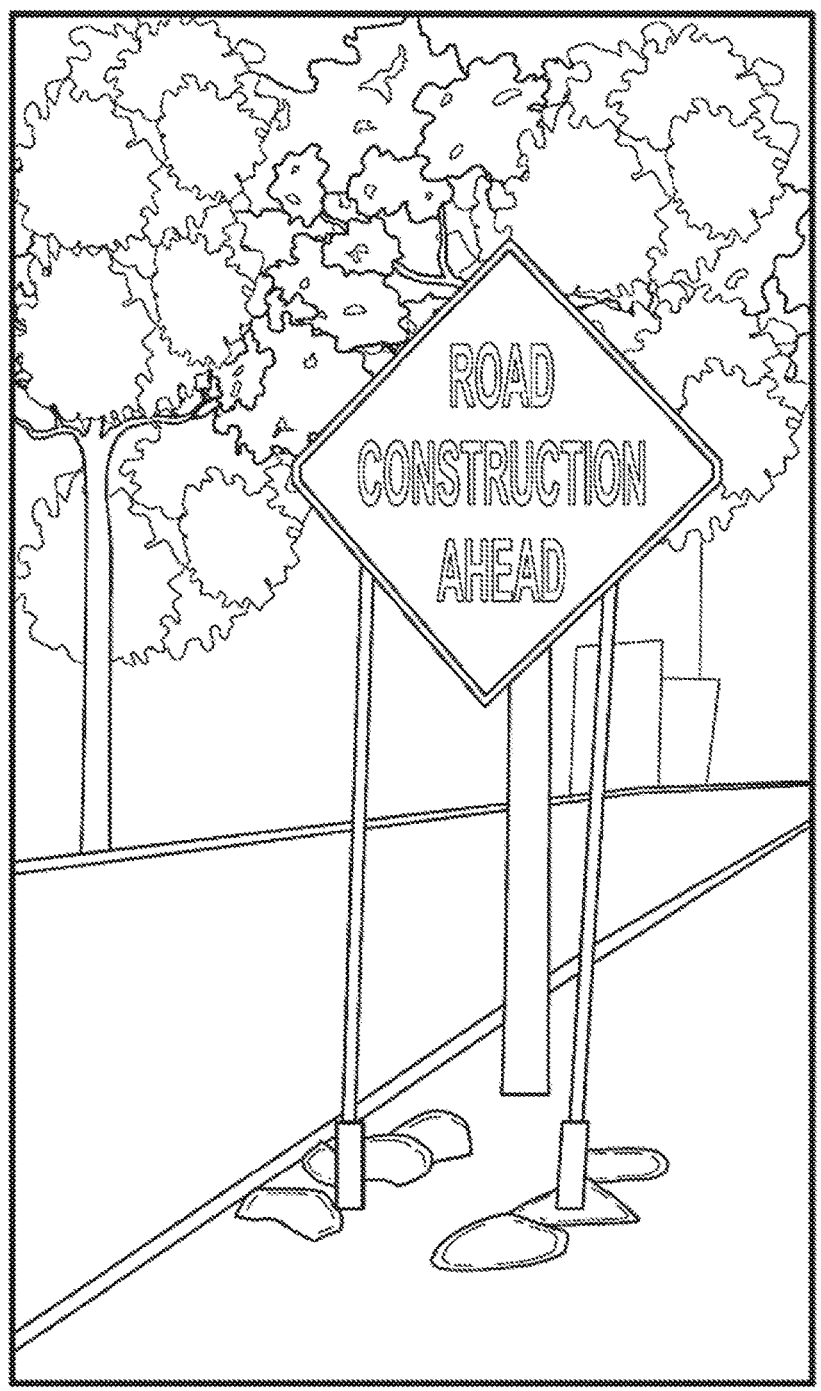
FIGS. 6a-6b depict examples of permanent and temporary alert systems.
Figure 6B:
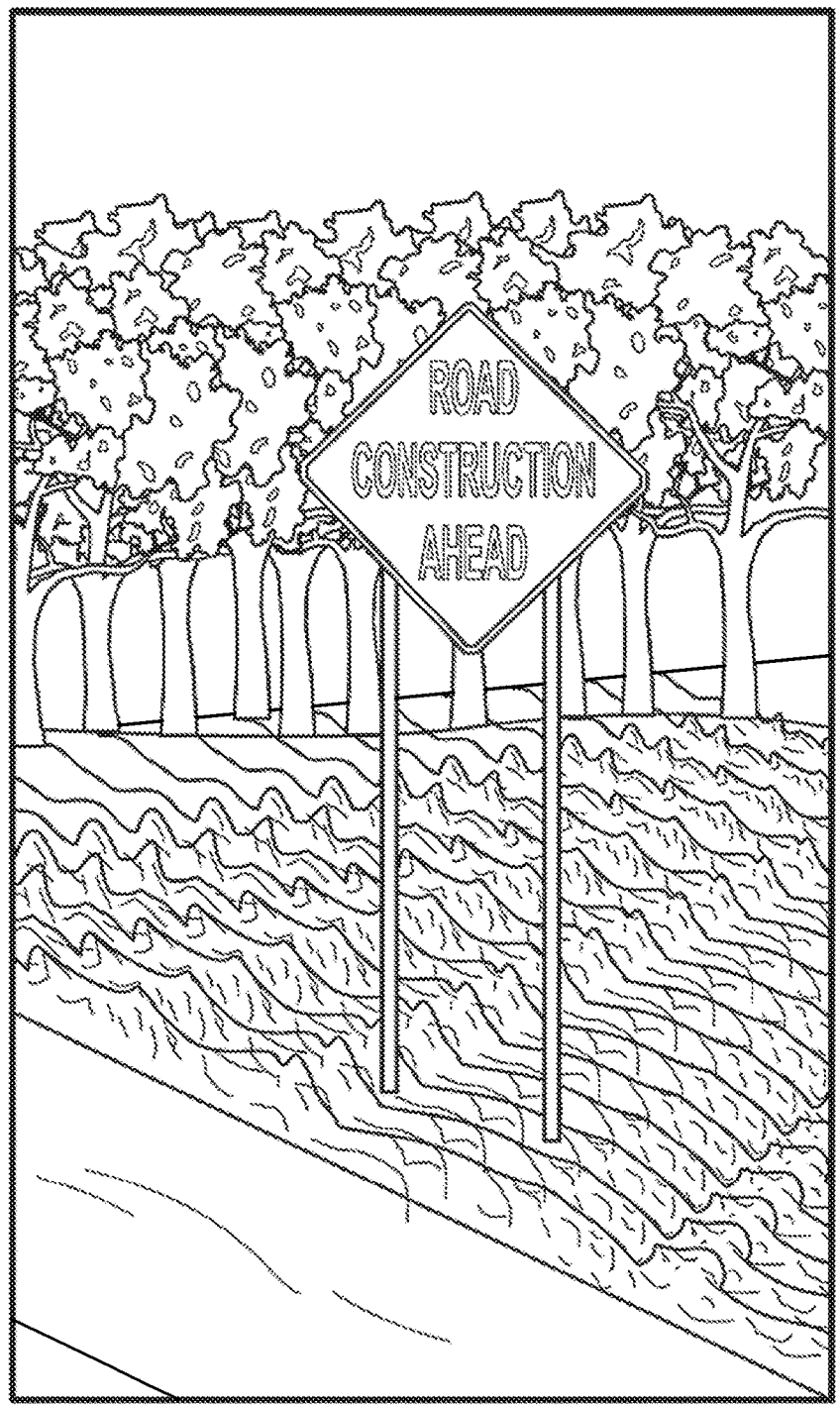

Although not exhaustive, the implementation of the herein disclosed method, device, and system has two main uses: temporary installation and permanent installation. The temporary installation can be used in work zones that are expecting queues or in areas where non-recurring congestion is anticipated. An installation technique can be similar to that of a temporary work zone sign, as shown in FIG. 6a. The permanent installations can be used in urban areas and where there are regular instances of recurring and non-recurring congestion. A permanent installation can be mounted to a permanent sign fixture similar to that shown in FIG. 6b. This device has numerous applications and, because the data sources that it uses are a rapidly emerging global technology, the device has unlimited growth potential.

Figure 7:
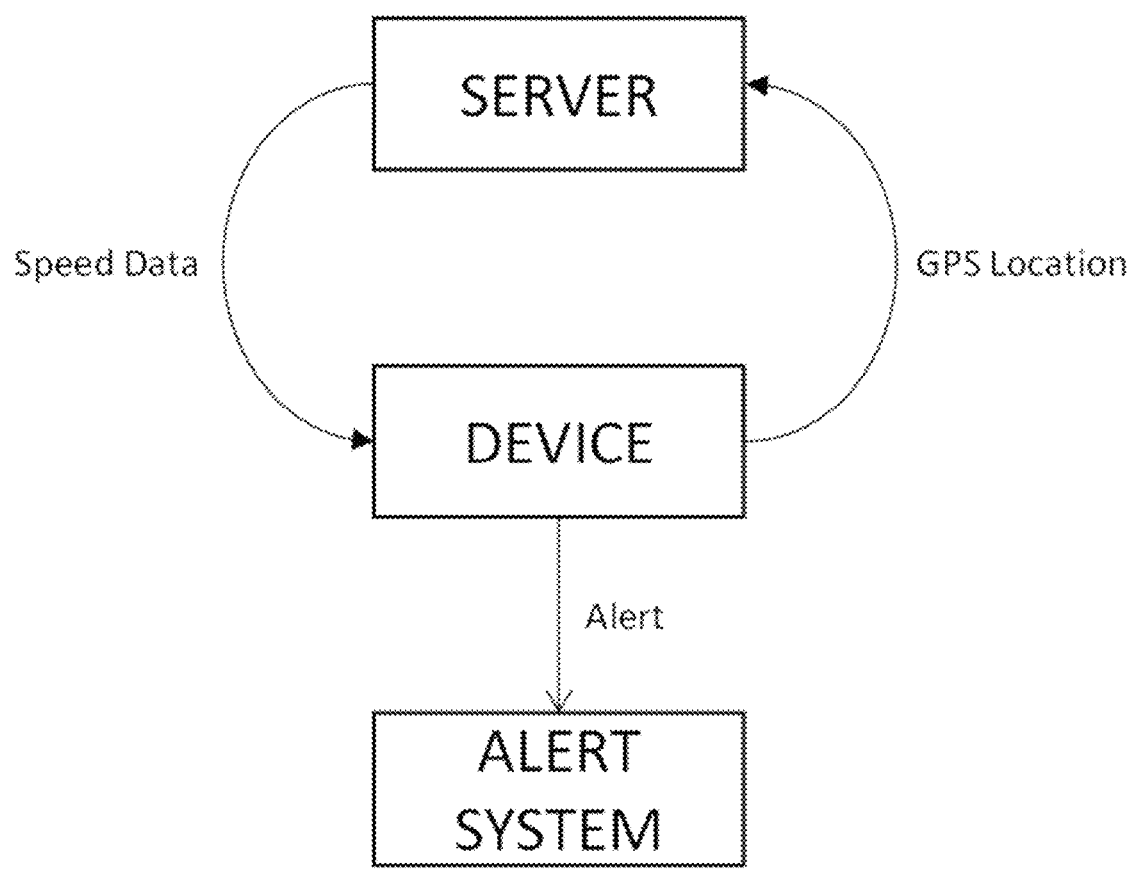
FIG. 7 illustrates the basic overview of the herein disclosed device's function.

An embodiment of the disclosed device application is shown in FIG. 7. The device sends a GPS location to a server and the server sends back the traffic data required nearest to the device. The device then uses built-in logic statements to determine if or which alert to send to the attached alert system. The foregoing is a simpler representation of the herein disclosed device, following a simple path from data server to device to alert system.

Figure 8:
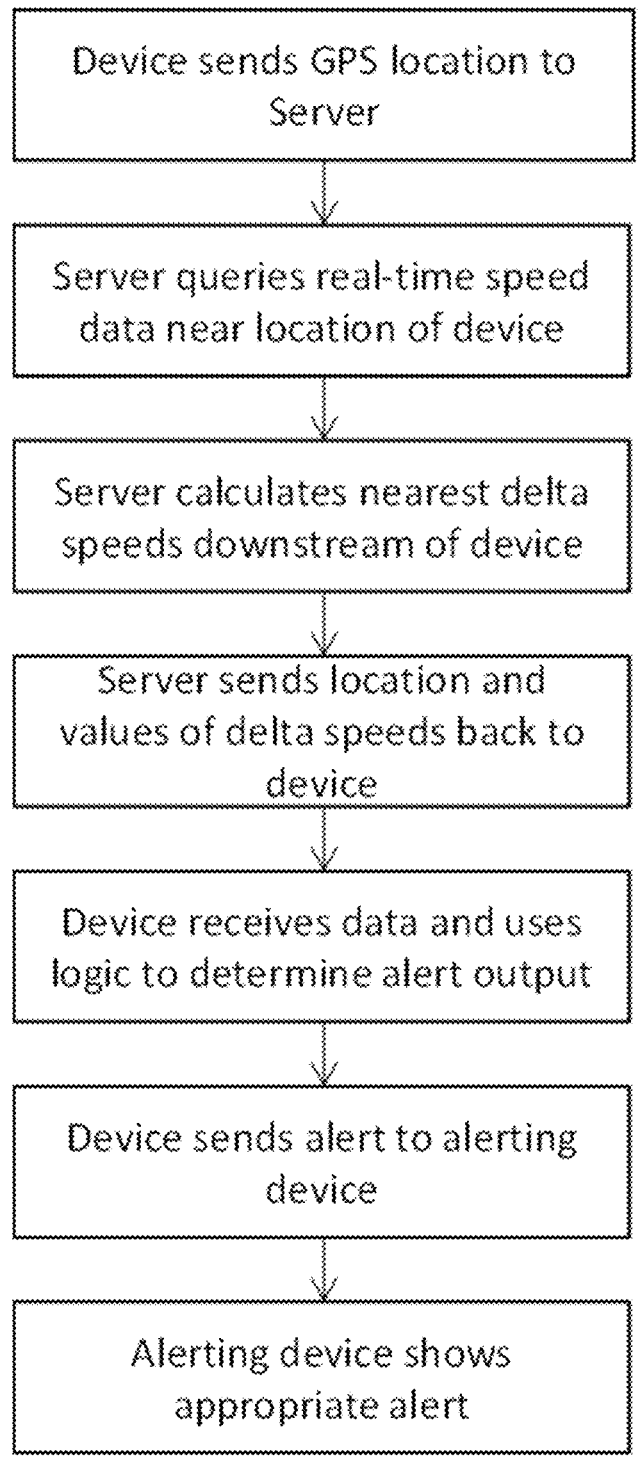
FIG. 8 is a schematic depicting the device's process flow operation.

The process in which the device retrieves the information and outputs the alert is depicted in FIG. 8. FIG. 8 elaborates on the data required to process the crowd sourced probe vehicle data and calculate delta speeds. It also elaborates on the server process to distribute the required speed data. It is important to note that the herein disclosed process can be completed with one server, which is configured to collect the raw speed data and outputs the delta speeds or with two servers, one being a third-party cloud data source collecting the raw speed data and another being the storage server where the speeds are stored after purchasing from the third-party supplier.

Figure 9:
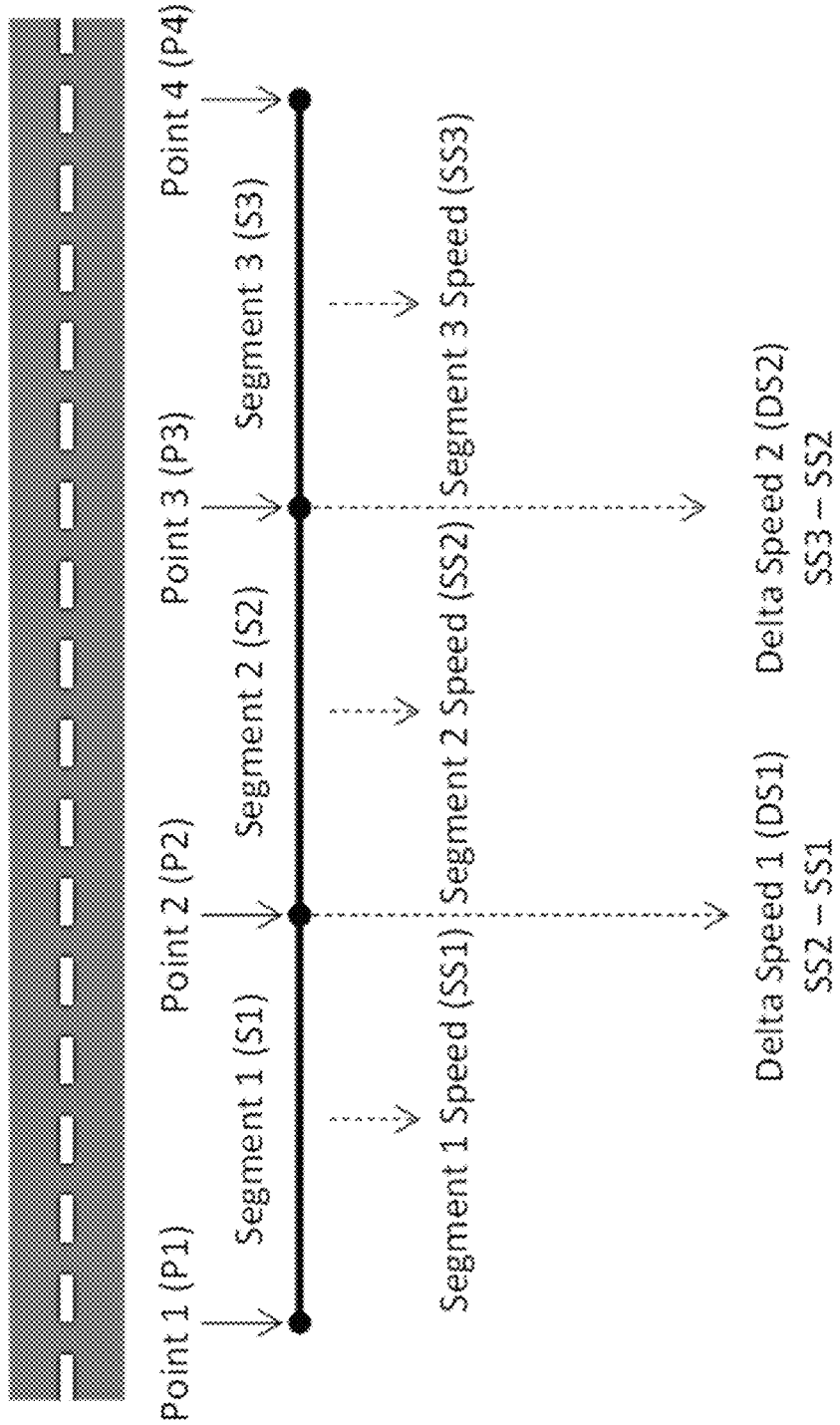
FIG. 9 depicts an explanation of delta speed data using segment speeds.
Figure 10:
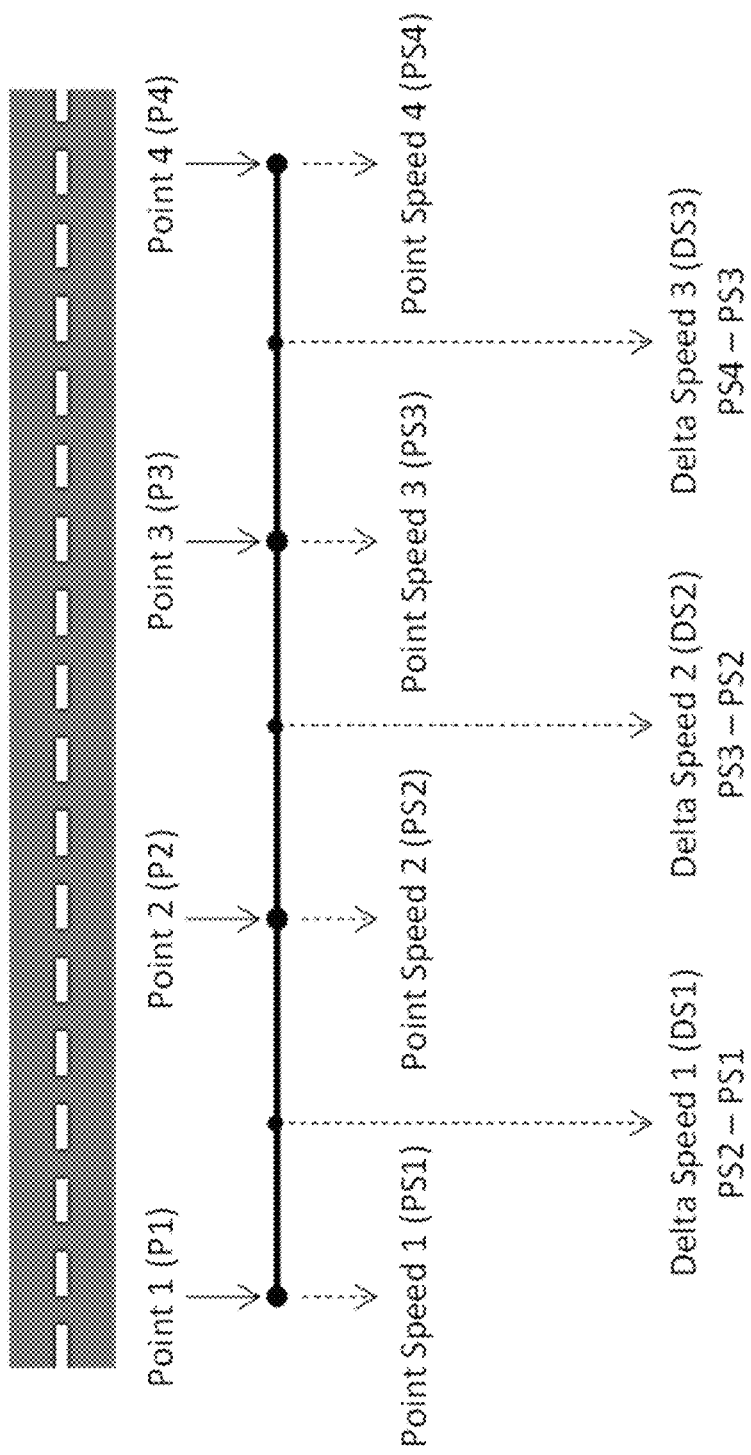
FIG. 10 depicts an explanation of delta speed data using point speeds.

It should also be noted that the device does not require a specific data type. Numerous methods of collecting speed data on roadways exist, any one of which can be inputted into the device. Two primary methods are segment speed and point speed. The segment speed methodology is depicted in FIG. 9. There are three segments where in an average speed is calculated. Using these segment speeds, a delta speed is determined at the points between the segments. The delta speed is defined as the difference between the average speeds of each segment. The segment speed methodology is primarily used by the third-party crowd sourced probe data providers. The other speed methodology that can be used is point speeds. Point speeds are generally used by departments of transportation with side-fire radar, loop detection, magnetometer detection, or other speed measurement devices. Point speeds can also be used by this device to determine delta speeds, where the delta speed would be assumed to be between two adjacent point speeds (FIG. 10).

Figure 11:
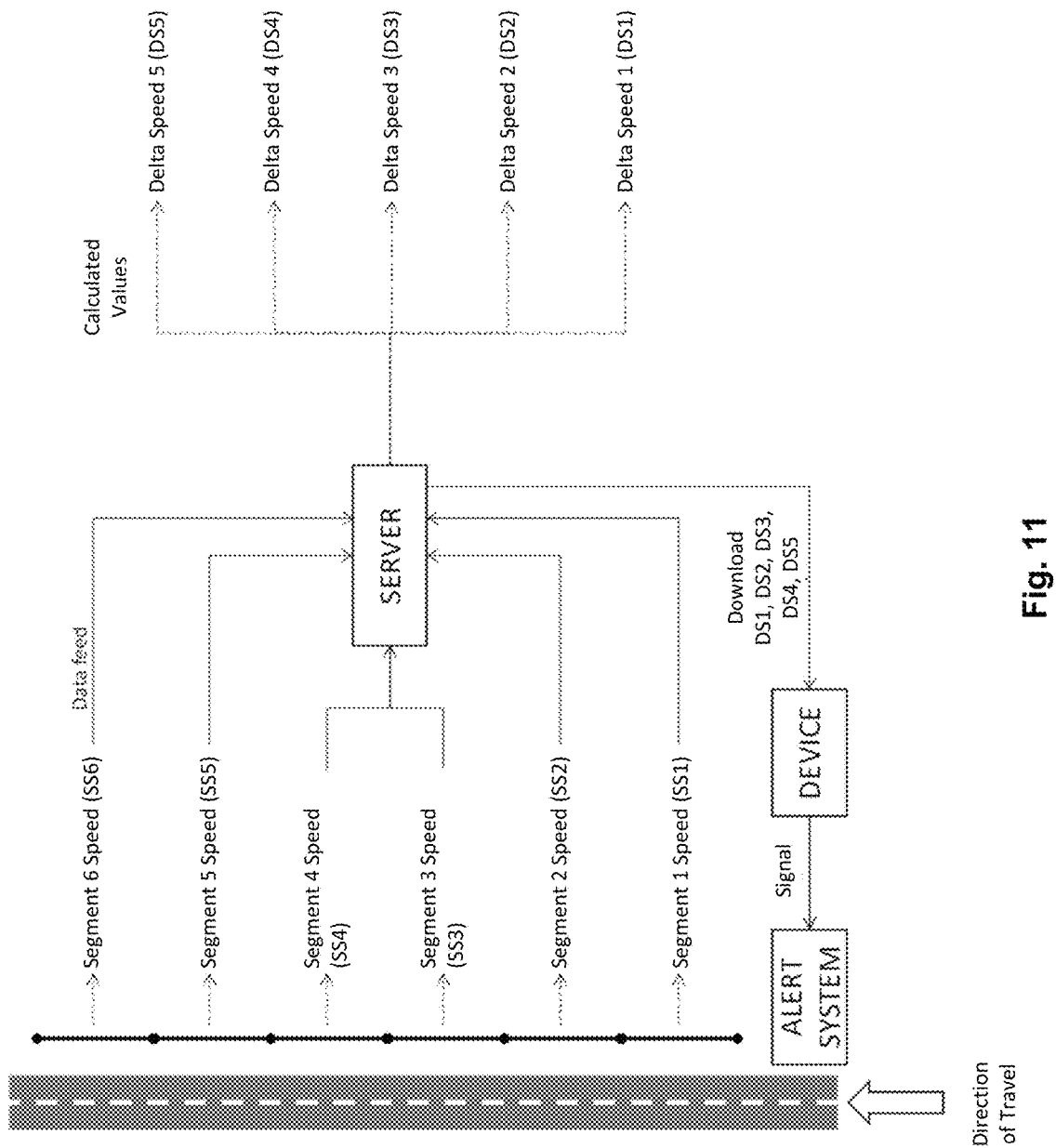
FIG. 11 illustrates the device methodology with server side calculations.
Figure 12:
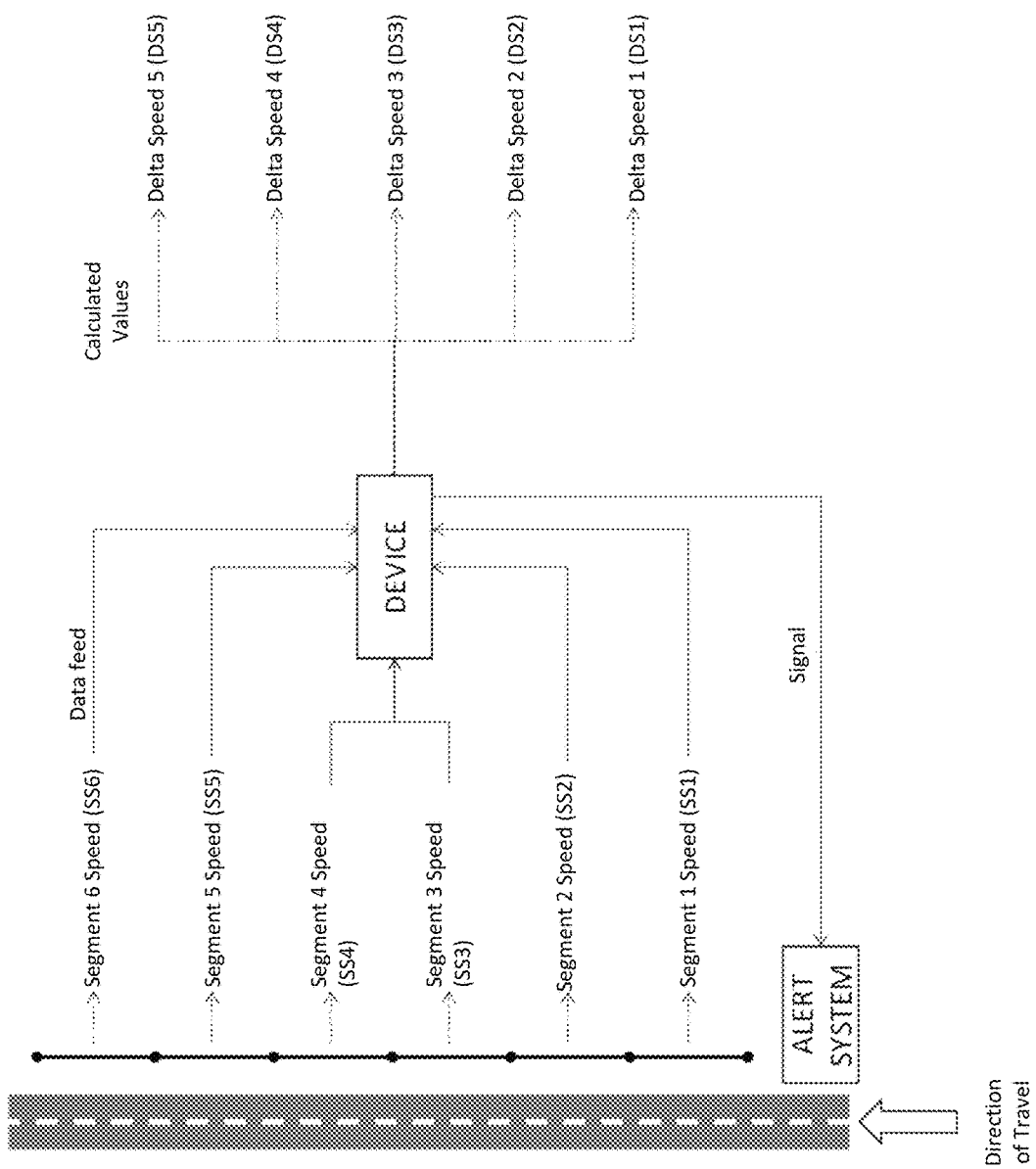
FIG. 12 illustrates the device methodology with device side calculations.

In addition, there are two methods in which the delta speeds can be calculated. Using the first method (FIG. 11), the delta speeds are calculated by the server and the device collects a number of delta speeds downstream based on its location. The second method (FIG. 12) involves the device collecting the speed information for a pre-determined number of segments or points downstream and calculates the delta speeds.

Figure 13:
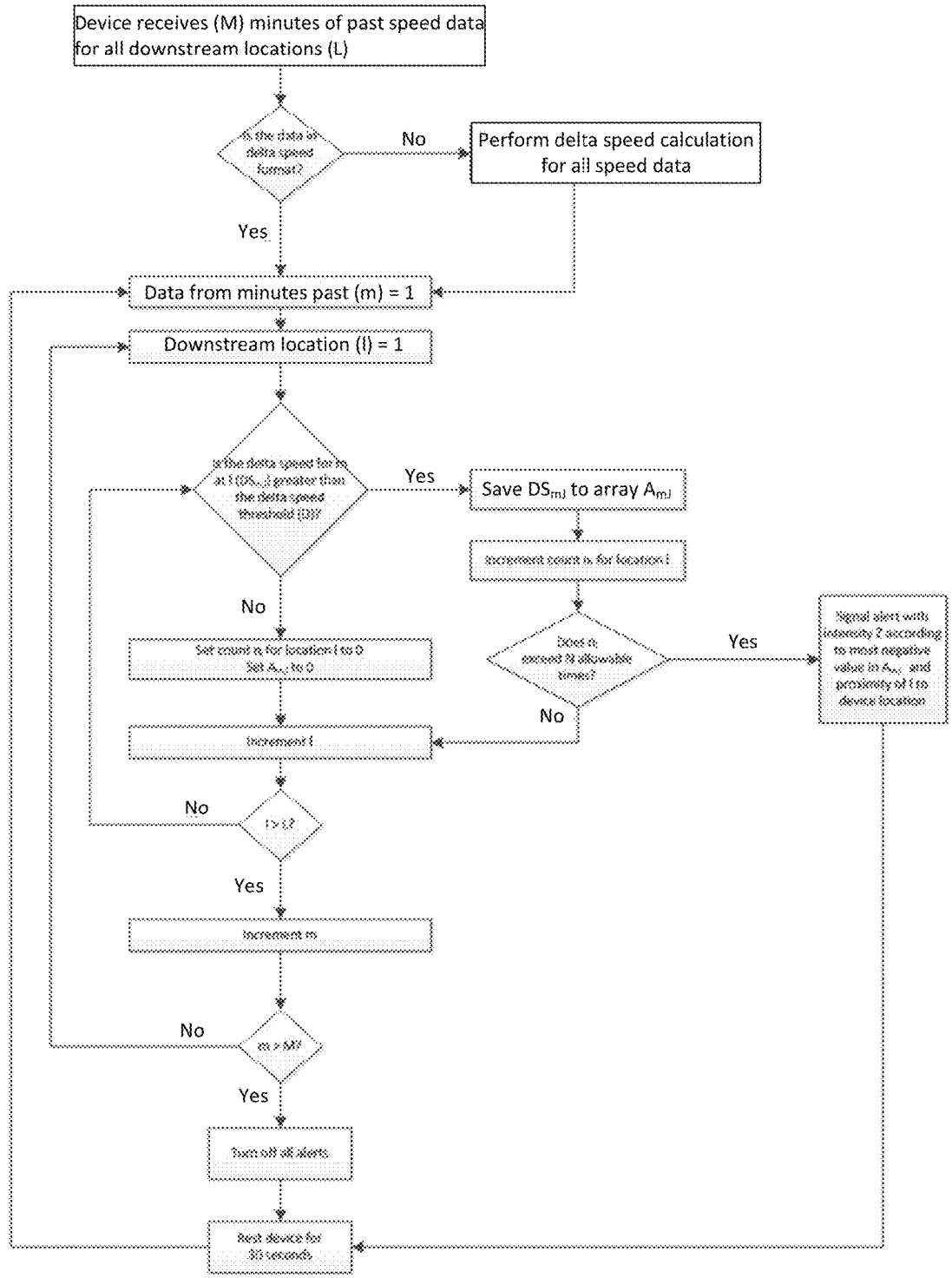
FIG. 13 illustrates a device logic flow chart.

The methodology in which the device triggers an alert is shown in FIG. 13. There are numerous variables that need to be defined by an operator (such as an engineer). These variables are used to provide flexibility for thresholds and data collection that will be flexible to scale spatially. These values include the number of minutes of data to retrieve (M), the number of downstream locations (L), the delta speed alert threshold value (D), the number of minutes this threshold can be exceeded (N), and the alert signal intensity for each delta representation (Z). The variables allows for a customization that can be adjusted for numerous use cases.

Figure 14:
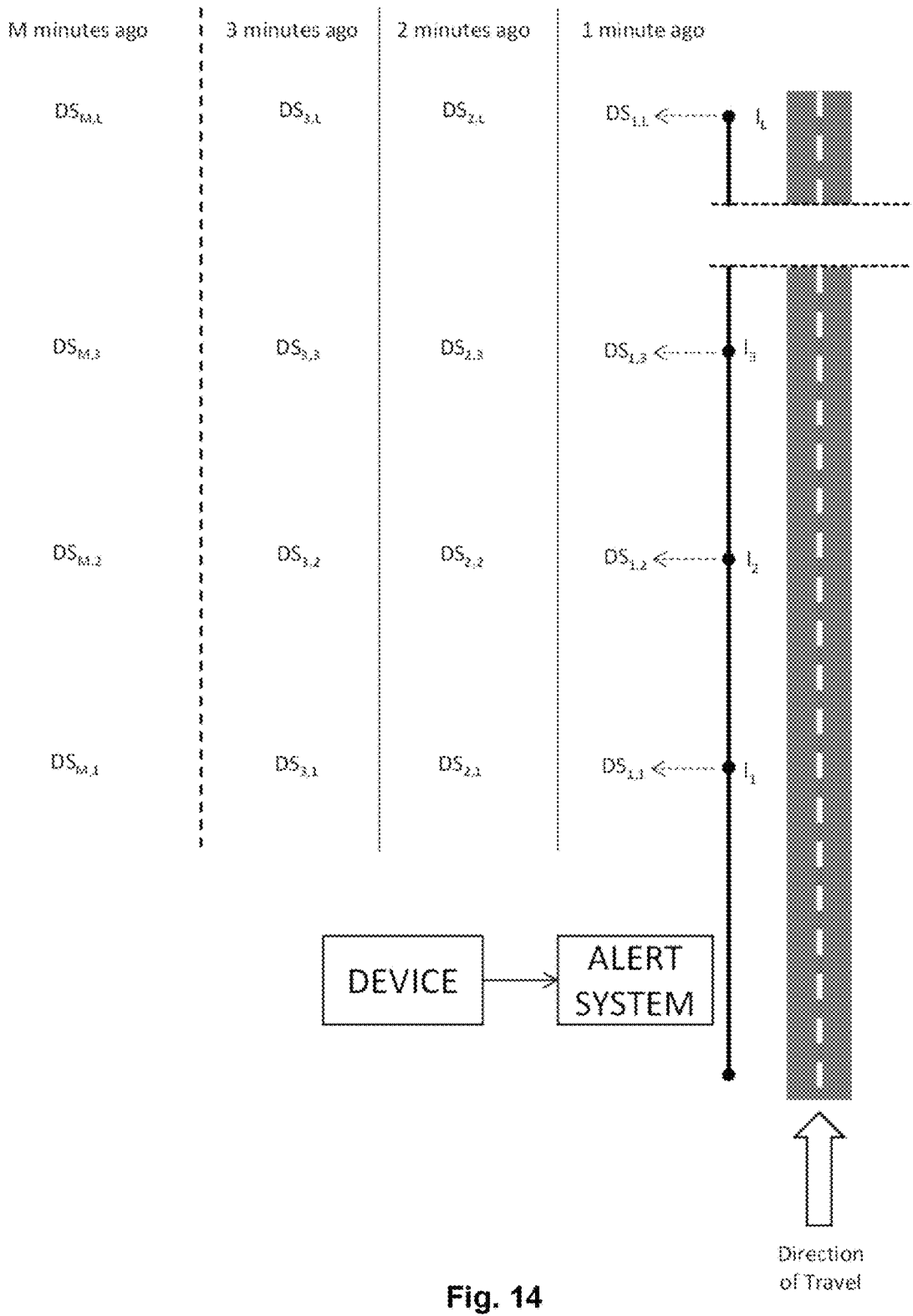
FIG. 14 depicts the data description with archived time data.

The delta speed collection is explained in FIG. 14. The delta speed calculation can be performed for a number of downstream segments (L). This feature allows the user to select the length of roadway ahead of the device where a warranted alert is displayed. The user can also determine how long the delta speed has to be above a certain threshold, allowing the device to be more customizable. These parameters can also affect the cost of both the data source, the server specifications, and the cellular requirements of the device.

Figure 15:
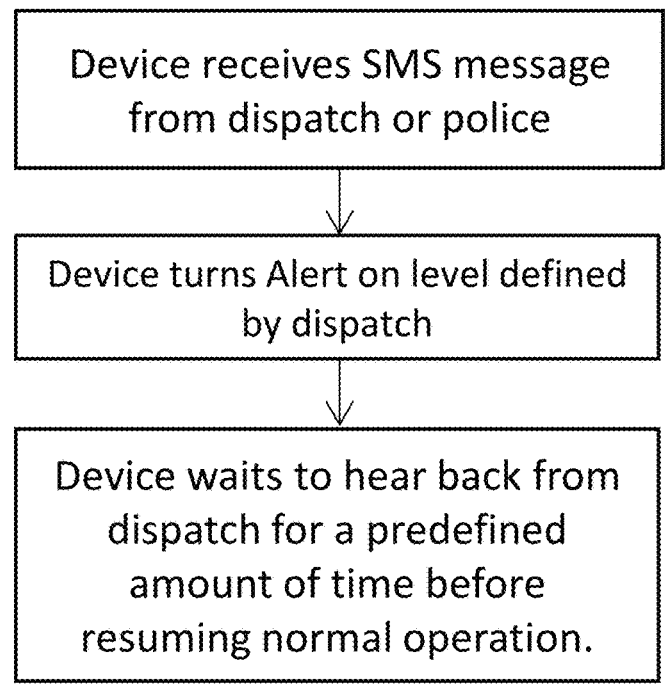
FIG. 15 illustrates the human-in-the-loop override alternative of the device.

In yet another embodiment, the device includes a manual override, where dispatch can bypass the device logic and manually turn on the alert system (defined in FIG. 15). In yet another embodiment, the device includes a peer-to-peer communication protocol.

Those skilled in the art will recognize that numerous modifications can be made to the specific implementations described above. The implementations should not be limited to the particular limitations described. Other implementations may be possible.

REFERENCES

1. Remias, S., T. Brennan, C. Day, H. Summers, E. Cox, D. Horton, and D. Bullock. 2012 *Indiana Mobility Report: Full Version*. 2013 doi: 10.5703/1288284315190, ISBN 978-1-62260-257-5.
2. Remias, S., T. Brennan, G. Grimmer, E. Cox, D. Horton, and D. Bullock. 2011 *Indiana Interstate Mobility Report—Full Version. Indiana Mobility Reports*. 2012 doi: 10.5703/1288284314680.
3. iCone: The instant I.T.S. System. http://iconeproducts.com/.
4. Li, H., S. M. Remias, C. M. Day, M. M. Mekker, J. R. Sturdevant, D. M. Bullock, *Incident Detection Using Cloud-Based Probe Data*. Transportation Research board, Paper No. 15-0714. 2015.

The invention claimed is:
1. A method for using a geo-referenced field device to query cloud-based traffic data to notify drivers of impending congestion, comprising:
placing a geo-referenced field device in a field, where the geo-referenced field device is communicatively coupled to a remotely located server configured to obtain speed data from a cloud source and perform calculations therefrom;

contacting the remotely located server with a geographic location of the geo-referenced field device;

transmitting, by the remotely located server, a message comprising cloud-based downstream traffic data associated with segments or points downstream of the geographic location of the geo-referenced field device to the geo-referenced field device, the message transmitted at a pre-defined interval, at a change of traffic condition downstream of the geographic location, or in response to polling received by the remotely located server via a message from the geo-referenced field device checking status of the cloud-based downstream traffic data, the remotely located server configured to monitor traffic conditions; and activating an audio and visual notification by the geo-referenced field device based upon the cloud-based downstream traffic data from the message from the remotely located server.

2. The method of claim 1, wherein the geo-referenced field device is configured to have global positioning system (GPS) orientation specified.

3. The method of claim 2, wherein the geo-referenced field device is configured to automatically acquire the geographic location from a GPS of the geo-referenced field device.

4. The method of claim 1, wherein the geo-referenced field device is configured to use an electronic compass to determine orientation of the geo-referenced field device.

5. The method of claim 1, wherein the geo-referenced field device is configured to have the geographic location specified by an operator.

6. The method of claim 5, wherein the geo-referenced field device is configured to have the geographic location adjusted by the operator.

7. The method of claim 1, wherein the cloud-based downstream traffic data is centrally-collected point data comprising information transportation systems (ITS) data between roadway interchanges and intersections.

8. The method of claim 1, wherein the cloud-based downstream traffic data is comprised of wireless technology-based segments.

9. The method of claim 8, wherein the wireless technology-based segments comprise Bluetooth.

10. The method of claim 8, wherein the wireless technology-based segments comprise WiFi.

11. The method of claim 1, wherein the cloud-based downstream traffic data is comprised of commercial probe data.

12. The method of claim 1, wherein the audio and visual notification is at least one of a siren, a portable message sign, a fixed message sign, at least one strobe on at least one fixed sign with messages determined by a reporting agency, or at least one strobe on at least one guardrail with at least one advance sign, where the at least one advance sign is configured to indicate how to interpret the at least one strobe.

13. The method of claim 1, wherein the geo-referenced field device is powered by at least one of an alternating current power source, a battery power source, or a battery source with solar augmentation.

14. The method of claim 1, wherein the downstream traffic data comprises delta speeds between the segments or points downstream of the geographic location of the geo-referenced field device.

15. The method of claim 14, wherein the geo-referenced field device activates the audio and visual notification based at least in part upon a comparison of the delta speeds to a threshold value.

16. The method of claim 15, wherein the audio and visual notification is activated when the delta speeds exceed the threshold value for a defined period of time.

17. The method of claim 16, wherein an intensity of the audio and visual notification is based upon a largest negative delta speed during the defined period of time.

18. A system for using a geo-referenced field device to query cloud-based traffic data to notify drivers of impending congestion, the system comprising:

the geo-referenced field device positioned by a roadway, including:
 a computer in the geo-referenced field device;
 a global positioning system (GPS) device configured to determine geographic location and orientation of the geo-referenced field device, the GPS device communicatively coupled to the computer; and
 a radio communication device;
a cloud data source; and
a remotely located server configured to deliver messages to the computer via the radio communication device, the messages comprising downstream speed data obtained from the cloud data source, the downstream speed data based upon the geographic location and orientation of the geo-referenced field device, where the computer is configured to activate a congestion notification for the drivers based upon the downstream speed data from the messages.

19. The system of claim 18, wherein the radio communication device is a commercial cellular communication device.

20. The system of claim 18, wherein the radio communication device is an RF device.

* * * * *